United States Patent
Nerlich et al.

(10) Patent No.: US 12,248,793 B2
(45) Date of Patent: Mar. 11, 2025

(54) MONITORING TRANSITIONS OF A CIRCUIT

(71) Applicant: TEXAS INSTRUMENTS INCORPORATED, Dallas, TX (US)

(72) Inventors: Ronald Nerlich, Dresden (DE); Mark Jung, Marzling (DE); Johann Zipperer, Unterschleißheim (DE); Dietmar Walther, Eching (DE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 18/465,213

(22) Filed: Sep. 12, 2023

(65) Prior Publication Data

US 2023/0418627 A1    Dec. 28, 2023

Related U.S. Application Data

(63) Continuation of application No. 17/123,407, filed on Dec. 16, 2020, now Pat. No. 11,755,342.

(51) Int. Cl.
| | |
|---|---|
| *G05B 1/03* | (2006.01) |
| *G05B 19/045* | (2006.01) |
| *G06F 8/34* | (2018.01) |
| *G06F 9/448* | (2018.01) |

(52) U.S. Cl.
CPC ......... *G06F 9/4498* (2018.02); *G05B 19/045* (2013.01); *G06F 8/34* (2013.01)

(58) Field of Classification Search
CPC ...................................................... G05B 1/03
See application file for complete search history.

(56) References Cited

U.S. PATENT DOCUMENTS

| | | | |
|---|---|---|---|
| 4,860,289 A * | 8/1989 | Coulson .............. | G06F 11/0757 714/E11.003 |
| 5,450,020 A | 9/1995 | Jones et al. | |
| 5,672,944 A * | 9/1997 | Gokhale ................. | H02P 6/10 318/702 |
| 6,018,263 A * | 1/2000 | Tihanyi .............. | H03K 17/0822 327/377 |
| 6,252,560 B1 | 6/2001 | Tanaka et al. | |
| 6,774,862 B2 | 8/2004 | Mizuno et al. | |
| 6,801,342 B1 * | 10/2004 | Shinozaki ............. | H04N 1/047 358/509 |
| 7,620,868 B2 | 11/2009 | Tailliet et al. | |
| 7,724,059 B2 | 5/2010 | Kapur | |

(Continued)

*Primary Examiner* — Jae U Jeon
(74) *Attorney, Agent, or Firm* — Michael T. Gabrik; Frank D. Cimino (57) ABSTRACT

A circuit includes a guard trigger circuit that includes a first input node adapted to be coupled to a first state signal, a second input node adapted to be coupled to a second state signal and an output node. The circuit also includes a reset synchronizer circuit that includes an input node coupled to the output node of the guard trigger circuit, a clock node adapted to be coupled to a clock signal and an output node. The circuit further includes a timeout circuit including an input node coupled to the output node of the reset synchronizer circuit, a clock node adapted to be coupled to the clock signal and an output node. The circuit still further includes a reset requestor circuit that includes a first input node coupled to the output node of the guard trigger circuit, a second node coupled to the output node of the timeout circuit.

19 Claims, 5 Drawing Sheets

(56) References Cited

U.S. PATENT DOCUMENTS

| | | | |
|---|---|---|---|
| 8,352,388 B2 | 1/2013 | Estes | |
| 8,990,748 B1* | 3/2015 | Tidwell | G06F 30/327 |
| | | | 716/108 |
| 10,789,182 B2 | 9/2020 | Bell et al. | |
| 2005/0188277 A1* | 8/2005 | Tayler | G06F 11/076 |
| | | | 714/39 |
| 2008/0263524 A1 | 10/2008 | Adams et al. | |
| 2010/0283520 A1* | 11/2010 | Ku | H03L 7/0814 |
| | | | 327/158 |
| 2013/0033468 A1* | 2/2013 | Takahashi | G11C 19/184 |
| | | | 345/204 |
| 2019/0340130 A1 | 11/2019 | Brown et al. | |
| 2020/0089416 A1 | 3/2020 | Brown et al. | |

* cited by examiner

FIG. 5 ns of a circuit.

MONITORING TRANSITIONS OF A CIRCUIT

CROSS-REFERENCE TO RELATED APPLICATIONS

This application is a continuation of U.S. patent application Ser. No. 17/123,407, filed Dec. 16, 2020, which is hereby incorporated by reference in its entirety herein.

TECHNICAL FIELD

This relates generally to electronic circuitry, and more particularly to monitoring transitions of a circuit.

BACKGROUND

In the fields of electronics and computer science a finite state machine (FMS) refers to a computation model that implemented with hardware or software that is employable to simulate sequential logic and/or execution of certain computer programs. FSMs are employable to model problems in many fields including mathematics, artificial intelligence, games, and linguistics.

An FSM implemented in a digital circuit can include, but is not limited to a programmable logic device, a programmable logic controller, logic gates, flip-flops and/or relays. In such a situation a programmable component of the FSM stores state variables and combinational logic to determine a state transition and an output of the FSM. Additionally, in some examples, an FSM can be instantiated on a computing platform, such as a general-purpose computer or a controller.

SUMMARY

In a first example, a circuit includes a guard trigger circuit that includes a first input node adapted to be coupled to a first state signal, a second input node adapted to be coupled to a second state signal and an output node adapted to provide a trigger signal. The guard trigger circuit is adapted to determine a state transition in progress based on the first state signal and the second state signal and provide the trigger signal based on whether the state transition is in progress. The circuit can include a reset synchronizer circuit that includes an input node coupled to the output node of the guard trigger circuit, a clock node adapted to be coupled to a clock signal and an output node adapted to provide a synchronization signal based on the trigger signal. The circuit can further include a timeout circuit that includes an input node coupled to the output node of the reset synchronizer circuit, a clock node adapted to be coupled to the clock signal; and an output node adapted to provide a timeout signal based on the synchronization signal. The circuit also includes a reset requestor circuit including a first input node coupled to the output node of the guard trigger circuit, a second node coupled to the output node of the timeout circuit and an output node adapted to provide a reset signal based on the trigger signal and the timeout signal.

In a second example, a method includes asserting a trigger signal in response to detecting that a transition in a circuit is in progress. The method also includes asserting a synchronization signal in response to detecting the trigger signal being asserted for a first number of cycles in a clock signal. The method further includes asserting a timeout signal in response to detecting the synchronization signal being asserted for a second number of cycles in the clock signal. The method also includes asserting a reset signal in response to detecting the timeout signal and the trigger signal being asserted concurrently.

DETAILED DESCRIPTION

This disclosure relates to a guardian circuit (e.g., a sub-circuit) for an external circuit, such as a finite state machine (FSM) implemented on a circuit (e.g., an IC chip). Some FSMs switch states on a rapid basis over a long period of time. For instance, in one example, a flow meter circuit might switch between a first state that measures flow and a second state that writes a value to memory characterizing the measured flow. In such situations, throughout a lifetime of the FSM, the FSM may get stuck between state transitions. For instance, in the example of a flow meter circuit, the transition between the first state (measuring the flow, an analog operation) and the second state (writing to memory, a digital operation) may include switching power modes. Such state transitions might slow down or hang-up operations of the circuit if the state transitions are not completed as expected. Moreover, area and power constraints might not provide sufficiently complex solutions to such problems.

The guardian circuit module receives a guardian clock signal that operates independently of other clock signals within the circuit. To increase the robustness of such a circuit, the guardian circuit detects a start of a state transition (e.g., based on a state signal and a next state signal) in the FSM and responds if a given period of time elapses before the state transition completes. In some examples, in response to detecting the state transition, the guardian circuit module asserts a trigger signal. The guardian circuit module is configured to assert a reset signal in response to the trigger signal being asserted for a threshold number of cycles in the guardian clock signal. The reset signal is employable to reset the FSM to a known safe state, such as an initial power-on state. Conversely, if the state transition is completed prior to the guardian clock signal cycling the threshold number of cycles, the trigger signal is de-asserted, and the reset signal is not asserted. In this manner, if a state transition takes too long (more than the threshold cycle count of the guardian clock signal), the guardian circuit module asserts the reset signal, which causes the FSM to reset.

Figure 1:
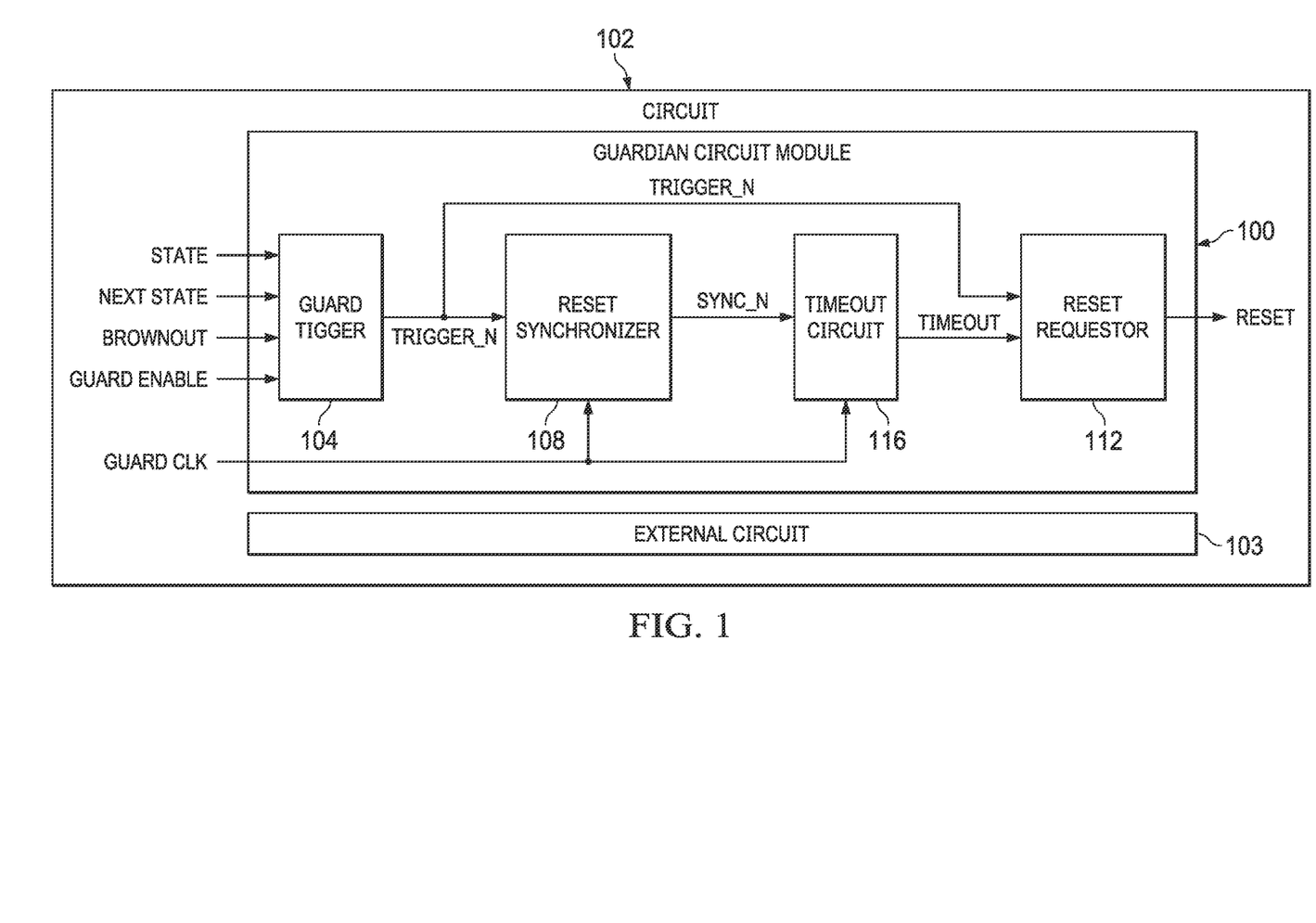
FIG. 1 is a block diagram of a guardian circuit module that is employable to monitor operations of an external circuit.

FIG. 1 is a block diagram of a guardian circuit module 100 implemented as a circuit, such as a sub-circuit that is employable to monitor operations of an external circuit 103, implemented on a circuit 102, such as a system on a chip (SoC). The external circuit 103 is implemented, for example, by a controller operating on the SoC. In such a situation, the guardian circuit module 100 is implemented as a sub-circuit on the SoC. The guardian circuit module 100 is configured to assert a reset signal, RESET based on a status of input signals. The reset signal, RESET is implemented as a high priority reset signal. Accordingly, components (e.g., such as the external circuit 103) of the circuit 102 are reset and restored to a safe state, such as an initial power-on state in response to the reset signal, RESET being asserted.

In some examples, the external circuit 103 is implemented as an FSM. In other examples, the external circuit 103 is implemented as a circuit to facilitate handshaking. In still other examples, the external circuit 103 is implemented as a power module. For purposes of simplification of explanation, examples are described wherein the external circuit 103 is implemented as an FSM. In any of these examples, and other examples, the external circuit 103 may have transitions (e.g., state transitions, signal transitions, feedback return signals, etc.) that could cause the external circuit 103 to delay or hang.

More particularly, in some examples, the external circuit 103 is implemented as a software defined FSM of the circuit 102, particularly in situations where the circuit 102 is implemented as an SoC with an embedded controller. In other examples, the external circuit 103 is implemented as a hardware module within the circuit 102. In either situation (and other situations), there may be race conditions and/or priority hierarchies that cause state transitions in the FSM to delay or hang. Additionally, even in situations where the external circuit 103 is relatively simple, power sags (e.g., brownouts) could cause sub-threshold voltage levels at the external circuit 103, and such sub-threshold voltage levels may delay or prevent a transition from completing. For instance, in a situation where a transition includes changing power modes, a power sag could impede the external circuit 103, implemented as an FSM, from completing a transitioning from a state with a low power mode to a state with a high power mode.

The guardian circuit module 100 receives a dedicated clock signal, GUARD CLK, which can alternatively be referred to as a guardian clock signal. In some examples, the dedicated clock signal, GUARD CLK, is implemented as a clock signal that is independent of other clock signals employed on the circuit 102. In some examples, the guardian circuit module 100 includes components (e.g., a clock generator) for generating the guardian clock, GUARD CLK. In other examples, the guardian clock, GUARD CLK is generated by a component of the circuit 102 external to the guardian circuit module 100. The dedicated clock signal, GUARD CLK has a clock counter interval that is longer than a maximum permitted time for a longest transition to complete in the external circuit 103. For instance, in some examples, the dedicated clock signal, GUARD CLK is three orders of magnitude or more longer than a counter interval of a system clock signal of the circuit 102 that controls operations of the external circuit 103. For instance, in some examples if the system clock signal drives operations on the external circuit 103, and has a counter interval of about 1 microsecond (µs), the dedicated clock signal, GUARD CLK would have a counter interval of about 1 millisecond (ms) or more. In this manner, the dedicated clock signal, GUARD CLK is slower than the system clock signal.

The guardian circuit module 100 includes a guard trigger circuit, referred to as a guard trigger 104. The guard trigger 104 is configured to assert a trigger signal, TRIGGER_N based on a status of input signals. In particular, the guard trigger 104 receives a state signal, STATE, and a next state signal, NEXT STATE that characterizes a present state of the external circuit 103, implemented as an FSM and a next state of the external circuit 103, respectively. The state signal, STATE, and the next state signal, NEXT STATE represent signals that are generated based on a comparison of state vectors for the external circuit 103. The guard trigger 104 also receives a brownout signal, BROWNOUT that characterizes a power status of the circuit 102. The brownout signal, BROWNOUT is asserted, for example, in situations where there is insufficient power to operate the circuit 102 and/or the circuit 102 is being reset. In some examples, the guard trigger 104 also receives a guard enable signal, GUARD ENABLE that is asserted to enable operation of the guard trigger 104.

In the examples described herein, the term "asserted" (and its derivatives) in reference to a given signal refers to the given signal being assigned a logical 1 or a logical 0 depending on the type of the given signal. More particularly, if the given signal is an active high signal, assertion of the given signal sets the given signal to a logical 1. Additionally, if the given signal is an active low signal, assertion of the given signal sets the given signal to a logical 0. Conversely, the term "de-asserted" (and its derivatives) in reference to the given signal indicates that the given signal is assigned the opposite logical value from the logical value the given signal is assigned to assert the given signal. For instance, if the given signal is an active high signal, de-asserting the given signal sets the given signal to a logical 0. Additionally, if the given signal is an active low signal, de-asserting the given signal sets the given signal to a logical 1. Moreover, it is understood that in examples where a given signal is described as being active high or active low, respectively, in other examples, the given signal is implemented as active low or active high, respectively.

In some examples, the guard trigger is configured to assert the trigger signal, TRIGGER_N in response to detecting a state transition is in progress at the external circuit 103. The state transition is indicated by a status of the state signal, STATE and the next state signal, NEXT state. More particularly, if the state signal, STATE is asserted and the next state signal, NEXT STATE is not asserted, or vice versa, the guard trigger 104 determines that the external circuit 103 is in a transition (e.g., a state transition), and the guard trigger 104 asserts the trigger signal, TRIGGER_N. Conversely, if the state signal, STATE and the next state signal, NEXT STATE are both asserted, the guard trigger 104 de-asserts the trigger signal, TRIGGER_N.

Additionally, a number of conditions can cause the guard trigger to inhibit (prevent) assertion of the trigger signal, TRIGGER_N. In particular, the guard trigger 104 is configured such that if the brownout signal, BROWNOUT is asserted, the guard trigger 104 de-asserts the trigger signal, TRIGGER_N. The brownout signal, BROWNOUT is asserted in situations where the circuit 102 is being reset, and components, including the external circuit 103 are being set to a safe state, such as an initial, power-on state. The guard trigger 104 is configured to de-assert the trigger signal, TRIGGER_N to allow for the external circuit 103 of the circuit 102 to be set to the initial, power on state without interruption.

Similarly, the guard trigger 104 is configured to inhibit assertion of the trigger signal if the guard enable signal, GUARD ENABLE is de-asserted. De-assertion of the guard enable signal, GUARD ENABLE indicates that the operations of the guardian circuit module 100 are to be disabled.

In some examples, the guard trigger 104 maintains the trigger signal, TRIGGER_N in the asserted state until (i) the state signal, STATE and the next state signal, NEXT STATE are asserted, (ii) the brownout signal, BROWNOUT is asserted or (iii) the guard enable signal, GUARD ENABLE is de-asserted. In response to detection one of the events (i)-(iii), the guard trigger 104 de-asserts the trigger signal, TRIGGER_N. In other examples, more or fewer events than events (i)-(iii) cause the guard trigger 104 to de-assert the trigger signal, TRIGGER_N.

The trigger signal, TRIGGER_N is provided to a reset synchronizer circuit, referred to as a reset synchronizer 108 and to a reset requestor circuit, referred to as a reset requestor 112. The reset synchronizer 108 also receives the dedicated clock signal, GUARD CLK as an input. The reset synchronizer 108 is configured to assert a synchronization signal, SYNC_N if the trigger signal, TRIGGER_N is asserted for a predetermined number of cycles of the dedicated clock signal, GUARD CLK. In some examples, the reset synchronizer 108 is configured as a shift register. As one example, the reset synchronizer 108 is configured to assert the synchronization signal, SYNC_N in response to the trigger signal, TRIGGER_N being asserted for at least two cycles of the dedicated clock signal, GUARD CLK. In other examples, the reset synchronizer 108 is configured to assert the synchronization signal, SYNC_N after the trigger signal, TRIGGER_N has been asserted for more than two or less than two cycles of the dedicated clock signal, GUARD CLK.

The synchronization signal, SYNC_N is provided to a timeout circuit 116. The timeout circuit 116 also receives the dedicated clock signal, GUARD CLK. The timeout circuit 116 is configured to assert a timeout signal, TIMEOUT if the synchronization signal, SYNC_N is asserted for a predetermined number of cycles of the dedicated clock signal, GUARD CLK. In some examples, the timeout circuit 116 is configured as a shift register. As one example, the timeout circuit 116 is configured to assert the timeout signal, TIMEOUT in response to the synchronization signal, SYNC_N being asserted for at least three cycles of the dedicated clock signal, GUARD CLK. In other examples, the timeout circuit 116 is configured to assert the timeout signal, TIMEOUT after the synchronization signal, SYNC_N has been asserted for more than three or less than three cycles of the dedicated clock signal, GUARD CLK.

The timeout signal, TIMEOUT and the trigger signal, TRIGGER_N are provided to the reset requestor 112. The reset requestor 112 generates a reset signal, RESET if both the trigger signal, TRIGGER_N and the timeout signal, TIMEOUT are asserted. As noted, the reset signal, RESET is implemented as a high-priority request signal that causes the circuit 102 to reset the external circuit 103 to an initial power-on state (or some other safe state).

By implementing the guardian circuit module 100, a relatively simple and robust state transition monitoring circuit is provided for the external circuit 103. In particular, the guardian circuit module 100 asserts the reset signal, RESET in situations where the external circuit 103 delays beyond a threshold number of cycles of the dedicated clock signal, GUARD CLK (e.g., for 5 cycles of the dedicated clock signal, GUARD CLK) between state transitions. By asserting the reset signal, RESET in this manner, the guardian circuit module 100 increases the robustness of the circuit 102. Moreover, the guardian circuit module 100 obviates the need for a high-power, complex monitor of the transitions of the external circuit 103.

Figure 2:
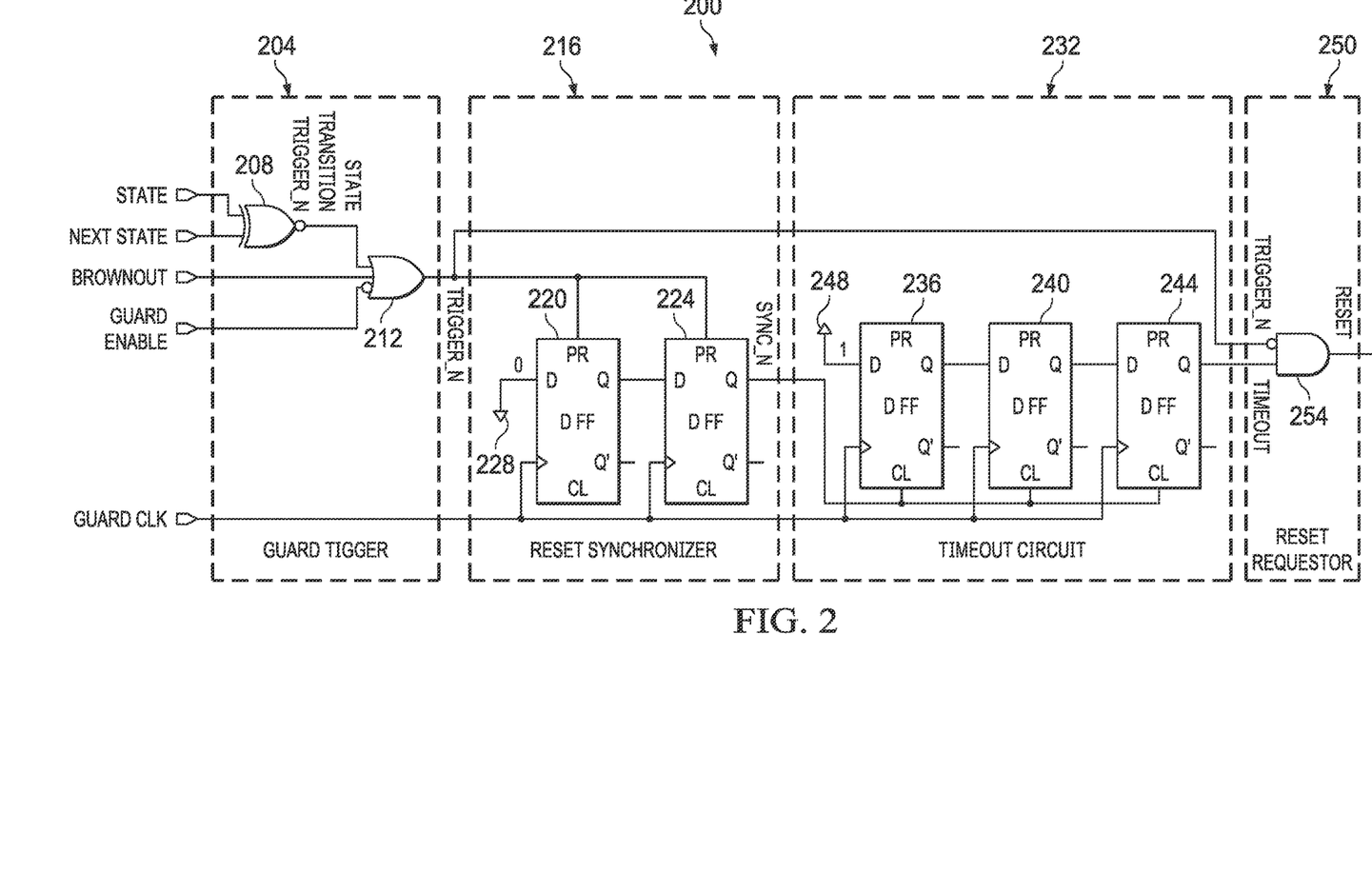
FIG. 2 is a circuit diagram of a guardian circuit module for an FSM.

FIG. 2 is a circuit diagram of a guardian circuit module 200 for an FSM. The guardian circuit module 200 is employable to implement the guardian circuit module 100 of FIG. 1. For purposes of simplification of explanation, the same signal and component names are employed in FIGS. 1 and 2 to denote the same signal or component.

The guardian circuit module 200 is implemented as a module of a circuit, such as the circuit 102 of FIG. 1. Unless otherwise noted, components of the guardian circuit module 200 are operable at sub-threshold levels. Thus, in situations where insufficient power is available to operate the FSM, the guardian circuit module 200 can still operate in the expected manner. The guardian circuit module 200 includes a guard trigger 204 that is employed to implement the guard trigger 104 of FIG. 1. The guard trigger 204 receives inputs characterizing a state of an FSM implemented on the circuit, such as the external circuit 103 of FIG. 1. More particularly, the guard trigger 204 receives a state signal, STATE and a next state signal, NEXT STATE that characterize a state of the FSM. In some examples, the state signal, STATE and a next state signal, NEXT STATE characterizes a comparison of state vectors for the FSM.

The state signal, STATE and a next state signal, NEXT STATE are coupled to inputs to an XNOR gate 208 of the guard trigger 204. The XNOR gate 208 outputs a state transition trigger signal, STATE TRANSITION TRIGGER_N to an input of an OR gate 212 of the guard trigger 204.

The term "couple" (and derivatives) is used throughout the specification. The term may cover connections, communications, or signal paths that enable a functional relationship consistent with the description of this disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A through the control signal generated by device A.

A brownout signal, BROWNOUT is coupled to the OR gate 212, and a guard enable signal, GUARD ENABLE is coupled to an inverted input of the OR gate 212. In the illustrated example, the brownout signal, BROWNOUT and the guard enable signal, GUARD ENABLE are active high signals. Assertion of the brownout signal, BROWNOUT indicates that the FSM is being reset to a safe state, such as an initial power-on state. For instance, the brownout signal, BROWNOUT is asserted in situations where power to the FSM drops below a threshold level.

The OR gate 212 outputs a trigger signal, TRIGGER_N. In the example illustrated, the trigger signal, TRIGGER_N is an active low signal. The guard trigger 204 asserts the trigger signal (logical 0), TRIGGER_N in response to the state transition trigger signal, STATE TRANSITION TRIGGER_N being de-asserted, the brownout signal, BROWNOUT (logical 0) being de-asserted and the guard enable signal, GUARD ENABLE (logical 1) being asserted.

The trigger signal, TRIGGER_N is coupled to an input of a reset synchronizer 216. A dedicated clock signal, GUARD CLK is coupled to a clock input of the reset synchronizer 216. The dedicated clock signal, GUARD CLK, has counter interval that is longer than a maximum time for a longest transition in the FSM. For instance, in some examples, the dedicated clock signal, GUARD CLK has a counter interval that is three orders of magnitude longer than a system clock signal of the circuit that is employed to drive operations of the FSM. For instance, if the system clock signal has a counter interval of about 100 nanoseconds (ns), the dedicated clock signal, GUARD CLK has a counter interval of about 100 µs. In other examples, the difference between the counter interval of the system clock signal and the dedicated clock signal, GUARD CLK are different. The reset synchronizer 216 is configured to assert a synchronization signal, SYNC_N (logical 0) if the trigger signal, TRIGGER_N is asserted (logical 0) for at least two cycles of the dedicated clock signal, GUARD CLK. In the example illustrated, the synchronization signal, SYNC_N is an active low signal. Conceptually, the reset synchronizer 216 receives an asynchronous signal, namely, the trigger signal, TRIGGER_N and outputs a signal synchronized with the dedicated clock signal, GUARD CLK, namely the synchronization signal SYNC_N.

In some examples, the reset synchronizer 216 is configured as a shift register. More particularly, in the example illustrated, the reset synchronizer 216 is implemented with two cascading D flip-flops, namely a first D flip-flop 220 and a second D flip-flop 224. The trigger signal, TRIGGER_N is coupled to a preset input, PR of the first D flip-flop 220 and the second D flip-flop 224. The dedicated clock signal, GUARD CLK is coupled to a clock input of the first D flip-flop 220 and the second D flip-flop. A tie low input 228 (e.g., about 0 Volts) is coupled to a data input, D of the first D flip-flop 220 to apply a logical 0 to the data input, D of the first D flip-flop 220. A non-inverted output, Q of the first D flip-flop 220 is coupled to a data input, D of the second D flip-flop 220. A non-inverted output, Q of the second D flip-flop 224 outputs the synchronization signal, SYNC_N of the reset synchronizer 216.

The synchronization signal, SYNC_N is coupled to an input of a timeout circuit 232. Additionally, the dedicated clock signal, GUARD CLK is coupled to a clock input of the timeout circuit 232. The timeout circuit 232 is configured to assert a timeout signal, TIMEOUT (logical 1) if the synchronization signal, SYNC_N is asserted (logical 0) for three or more cycles of the dedicated clock signal, GUARD CLK. In the example illustrated, the timeout signal, TIMEOUT is an active high signal.

In some examples, the timeout circuit 232 is implemented as a shift register. More particularly, the timeout circuit 232 may be implemented with three cascaded D flip-flops, namely a first D flip-flop 236, a second D flip-flop 240 and a third D flip-flop 244. In other examples, the timeout circuit 232 is implemented with a different number of D flip-flops.

The dedicated clock signal, GUARD CLK is coupled to a clock input of the first D flip-flop 236, the second D flip-flop 240 and the third D flip-flop 244 of the timeout circuit 232. The synchronization signal, SYNC_N is coupled to a clear input, CL of the first D flip-flop 236, the second D flip-flop 240 and the third D flip-flop 244 of the timeout circuit 232. The timeout circuit 232 includes a tie high input 248 that asserts a logical 1 on a data input, D of the first D flip-flop 236.

A non-inverted output, Q of the first D flip-flop 236 is coupled to a data input, D of the second D flip-flop 240. Similarly, a non-inverted output, Q of the second D flip-flop 240 is coupled to a data input, D of the third D flip-flop 244. Moreover, a non-inverted output, Q of the third D flip-flop 244 provides the timeout signal, TIMEOUT.

The timeout signal, TIMEOUT is coupled to an input of a reset requestor 250. The trigger signal, TRIGGER_N is also coupled to an input of the reset requestor 250. The reset requestor 250 asserts a reset signal, RESET (logical 1) in response to the timeout signal, TIMEOUT and the trigger signal, TRIGGER_N being asserted concurrently. In the illustrated example, the reset signal, RESET is an active high signal.

In the illustrated example, the reset requestor 250 is implemented with an AND gate 254 with an inverted input. In other examples, the reset requestor 250 is implemented with more logical gates and/or other circuit components. The trigger signal, TRIGGER_N is coupled to the inverted input of the AND gate 254. The timeout signal, TIMEOUT is coupled to a non-inverted input of the AND gate 254.

In the example illustrated, the state signal, STATE and the next state signal, NEXT STATE are active high signals and the state transition trigger signal, STATE TRANSITION TRIGGER_N is an active low signal. In situations where the FSM is remaining in the same state, both the state signal, STATE and the next state signal, NEXT STATE are asserted (logical 1). In situations where the FSM is transitioning between states, either the state signal, STATE or the next state signal, NEXT STATE is de-asserted (logical 0). If either (or both) of the state signals, STATE or the next state signal, NEXT STATE are de-asserted (logical 0), the state transition trigger signal, STATE TRANSITION TRIGGER_N is asserted (logical 0). The guard trigger 204 asserts the trigger signal (logical 0), TRIGGER in response to the state transition trigger signal, STATE TRANSITION TRIGGER_N (logical 0) being asserted, the brownout signal, BROWNOUT (logical 0) being de-asserted and the guard enable signal, GUARD ENABLE (logical 1) being asserted. Conversely, the guard trigger 204 de-asserts the trigger signal, TRIGGER_N (logical 1) in response the state transition trigger signal, STATE TRANSITION TRIGGER_N (logical 1) being de-asserted, the brownout signal, BROWNOUT (logical 1) being asserted or the guard enable signal, GUARD ENABLE (logical 0) being de-asserted.

The trigger signal, TRIGGER_N (logical 1) being de-asserted causes the first D flip-flop 220 and the second D flip-flop 224 on the reset synchronizer 216 to operate in a preset mode. In the preset mode, both the first D flip-flop 220 and the second D flip-flop 220 output a logical 1 on the respective non-inverted output, Q. Thus, if the trigger signal, TRIGGER_N is de-asserted (logical 1), the synchronization signal, SYNC_N is also de-asserted (logical 1).

The synchronization signal, SYNC_N (logical 1) being de-asserted, causes the first D flip-flop 236, the second D flip-flop 240 and the third D flip-flop 244 of the timeout circuit 232 to operate in a clear mode. In the clear mode, the first D flip-flop 236, the second D flip-flop 240 and the third D flip-flop 244 of the timeout circuit 232 output a logical 0 on the respective non-inverted outputs, Q. As noted, the non-inverted output Q of the third D flip-flop 244 of the timeout circuit 232 provides the timeout signal, TIMEOUT that is coupled to the AND gate 254 of the reset requestor 250 at a non-inverted input, Q. Additionally, the trigger signal, TRIGGER_N is coupled to the inverted input of the AND gate 254 of the reset requestor 250. The timeout signal, TIMEOUT (logical 0) being de-asserted and the trigger signal, TRIGGER_N (logical 1) being de-asserted causes the AND gate 254 to de-assert the reset signal, RESET (logical 0). Accordingly, the trigger signal, TRIGGER_N (logical 1) being de-asserted causes the reset signal, RESET to be de-asserted (logical 0).

Conversely, the trigger signal, TRIGGER_N (logical 0) being asserted, causes the first D flip-flop 220 and the second D flip-flop 224 of the reset synchronizer 216 to operate in shift mode. In shift mode, the logical 0 applied by the tie low input 228 is released into the cascade of D flip-flops of the reset synchronizer 216. In such a situation, the non-inverted output, Q of the first D flip-flop 220 of the reset synchronizer 216 is set to a logical 0 in response to a next pulse of the dedicated clock signal, GUARD CLK. Subsequently, in response to receipt of the logical 0 at the data input, D of the second D flip-flop 224, the second D flip-flop outputs a logical 0 on the non-inverted output, Q in response to a next pulse of the dedicated clock signal, GUARD CLK. As noted, the non-inverted output, Q on the second D flip-flop 224 of the reset synchronizer 216 provides the synchronization signal, SYNC_N to the timeout circuit 232, such that the synchronization signal, SYNC_N is asserted (logical 0).

In summary, the reset synchronizer 216 is configured to assert the synchronization signal, SYNC_N (logical 0) if the trigger signal, TRIGGER_N is asserted (logical 0) for at least two cycles of the dedicated clock signal, GUARD CLK. Additionally, if the trigger signal, TRIGGER_N is de-asserted (logical 1) prior to completion of the at least two clock cycles of the dedicated clock signal, GUARD CLK, the first D flip-flop 220 and the second D flip-flop 224 both transition to the preset mode, and the synchronization signal, SYNC_N is de-asserted (logical 1).

Assertion of the synchronization signal, SYNC_N (logical 0) sets the clear input, CL of the first D flip-flop 236, the second D flip-flop 240 and the third D flip-flop 244 of the timeout circuit 232 to a logical 0. In response, each of the first D flip-flop 236, the second D flip-flop 240 and the third D flip-flop 244 of the timeout circuit 232 operate in a shift mode. In the shift mode, the tie high input 248 applies a logical 1 on the data input, D of the first D flip-flop 236. In response to a next pulse of the dedicated clock signal, GUARD CLK, the first D flip-flop 236 outputs a logical 1 on the non-inverted output Q, which is coupled to the data input, D of the second D flip-flop 240.

Subsequently, if the data input, D of the second D flip-flop 240 is set to a logical 1, the second D flip-flop 240 outputs a logical 1 on the non-inverted output Q of the second D flip-flop 240 in response to a next clock pulse of the dedicated clock signal, GUARD CLK. As noted, the non-inverted output Q of the second D flip-flop 240 is coupled to the data input, D of the third D flip-flop 244. If the data input, D of the third D flip-flop 244 is set to a logical 1, the third D flip-flop 244 outputs a logical 1 on the non-inverted output Q of the third D flip-flop 244 in response to a next clock pulse of the dedicated clock signal, GUARD CLK. As noted, the non-inverted output, Q of the third D flip-flop 244 is the timeout signal, TIMEOUT.

In summary, the timeout circuit 232 is configured to assert the timeout signal, TIMEOUT (logical 1) if the synchronization signal, SYNC_N is asserted (logical 0) for at least three cycles of the dedicated clock signal, GUARD CLK. Additionally, if the synchronization signal, SYNC_N is de-asserted (logical 1) prior to completion of the at least three clock cycles of the dedicated clock signal, GUARD CLK, the first D flip-flop 236, the second D flip-flop 240 and the third D flip-flop 244 transition to the clear mode, and the timeout signal, TIMEOUT is de-asserted (logical 0). In response to the timeout signal, TIMEOUT (logical 1) being asserted and the trigger signal, TRIGGER_N (logical 0) being asserted, the reset requestor 250 asserts the reset signal, RESET.

Taken together, the reset synchronizer 216, the timeout circuit 232 and the reset requestor 250 assert the reset signal, RESET (logical 1) if the trigger signal, TRIGGER_N remains asserted (logical 0) for a threshold number of cycles of the dedicated clock signal, GUARD CLK (e.g., at least five cycles of the guardian clock cycle, GUARD CLK).

In some examples, the reset signal, RESET is a high priority reset request. Thus, in response to the RESET request being asserted, the FSM is set to an initial-power on state, or other safe state. Accordingly, the guardian circuit module 200 is a relatively simple and robust state transition monitor circuit for the FSM. In particular, the guardian circuit module 200 asserts the reset signal, RESET in situations where the FSM delays too long (e.g., for 5 cycles of the dedicated clock signal, GUARD CLK) between state transitions. The guardian circuit module 200 obviates the need for a high-power, complex monitor of the state transitions of the FSM.

Figure 3:
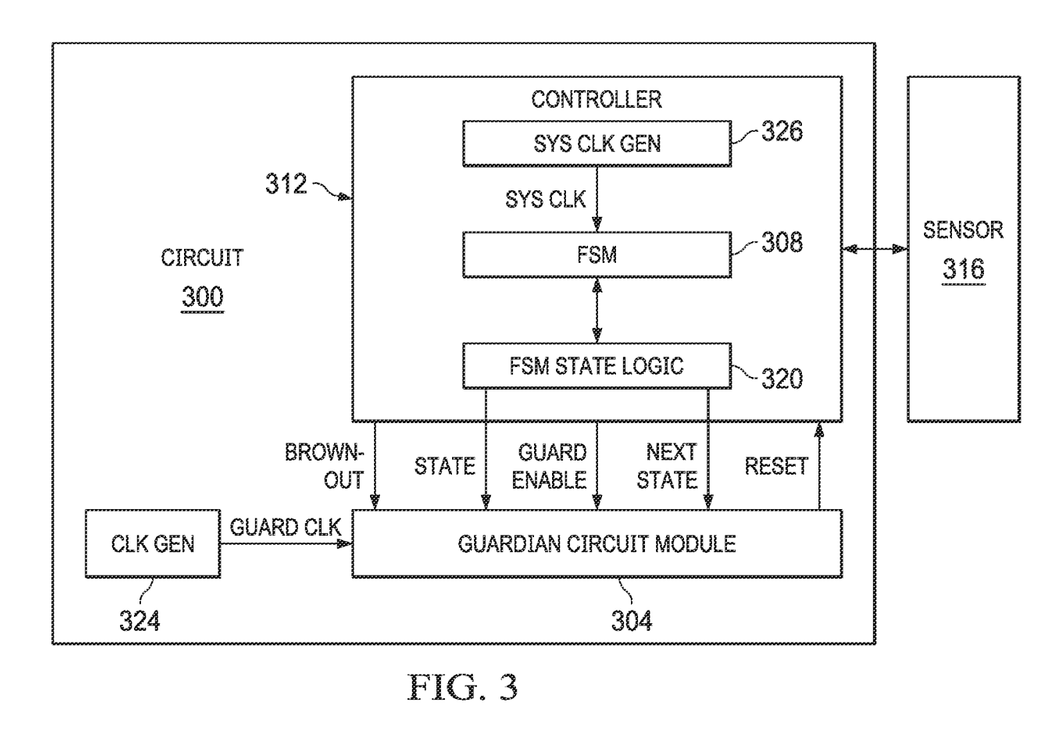
FIG. 3 is an example of a circuit that includes a guardian circuit module that monitors transitions of states in an FSM.

FIG. 3 illustrates an example of a circuit 300 (e.g., an SoC) that includes a guardian circuit module 304 that monitors transitions of states in an FSM 308. The circuit 300 is employable to implement the circuit 102 of FIG. 1. More particularly, the guardian circuit module 304 is employable to implement the guardian circuit module 100 of FIG. 1 and/or the guardian circuit module 200 of FIG. 2.

In the present example, the FSM 308 operates as a software instantiated FSM operating on a controller 312 of the circuit 300. In some examples, the controller 312 is implemented as a computing platform that includes a general-purpose processor with embedded instructions for implementing the FSM 308. In various examples, the FSM 308 is implemented as a Mealy state machine, a Moore state machine or a Medvedev state machine or a combination thereof.

In the example illustrated, the controller 312 communicates with a sensor 316. In some examples, the sensor 316 is an analog sensor, such as a flow meter, a temperature sensor, an accelerometer, etc. In any such situation, it is presumed that the FSM 308 controls operations of the sensor 316. For instance, in one example, in a given state the FSM 308 causes the sensor 316 to measure an external condition (e.g., flow, temperature, acceleration, etc.) and in another state, the FSM 308 writes data characterizing the measured condition to a non-transitory memory of the controller 312. In such an example, in a given state, the FSM 308 operates in a high power mode, and in the other state, the FSM 308 operates in a low power mode. Accordingly, in this example, switching between the given state and the other state includes switching power modes. In some instances, switching between power modes impedes or prevents the FSM 308 from completing a state transition.

The controller 312 includes an FSM state logic module 320. The FSM state logic module 320 is implemented as a gate network that monitors a state of the FSM 308. As an example, the FSM state logic module 320 compares state vectors of the FSM 308 to generate a state signal, STATE characterizing a current state of the FSM 308 and a next state signal, NEXT STATE characterizing a next state of the FSM 308. The state signal, STATE and the next state signal, NEXT STATE are provided to the guardian circuit module 304.

In some examples, the controller 312 provides a brownout signal, BROWNOUT. The brownout signal, BROWNOUT characterizes a power status of the circuit 300. The brownout signal, BROWNOUT is asserted, for example, in situations where there is insufficient power to operate the circuit 300 and/or the FSM 308 is being reset. In some examples, the controller 312 also provides the guardian circuit module 304 with a guard enable signal, GUARD ENABLE that is asserted to enable operation of the guardian circuit module 304.

The circuit 300 also includes a clock generator 324 that generates a dedicated clock signal, GUARD CLK. The dedicated clock signal, GUARD CLK operates independently of other clock signals in the circuit, including, but not limited to a system clock signal, SYS CLK that is generated by a system clock generator 326 (or other component) of the controller 312 that controls operations of the FSM 308. The dedicated clock signal, GUARD CLK has a counter interval that is longer than a maximum transition time for a state transition of the FSM 308. In some examples, the dedicated clock signal, GUARD CLK has a cycle time (period) that is three orders of magnitude (or more) longer than the cycle time of the system clock signal, SYS CLK. Thus, if the system clock signal, SYS CLK has a cycle time of 20 µs, the dedicated clock signal, GUARD CLK has a cycle time of 20 ms or longer. In other examples, other relationships between the cycle time of the dedicated clock signal, GUARD CLK, and the system clock signal, SYS CLK are selected.

The guardian circuit module 304 is configured to assert a reset signal, RESET in certain conditions, as described herein. More particularly, the guardian circuit module 304 is configured to assert the reset signal, RESET in situations where the guard enable signal, GUARD ENABLE is asserted, the brownout signal, BROWNOUT is de-asserted, and the state signal, STATE and the next state signal, NEXT STATE indicate that the FSM 308 is in a state transition for at least a threshold number of cycles (e.g., five clock cycles) of the dedicated clock signal, GUARD CLK. The reset signal, RESET is provided to the controller 312. In response to assertion of the reset signal, RESET, the controller 312 commands the FSM 308 to transition to a safe state, such as an initial power on state.

Figure 4:
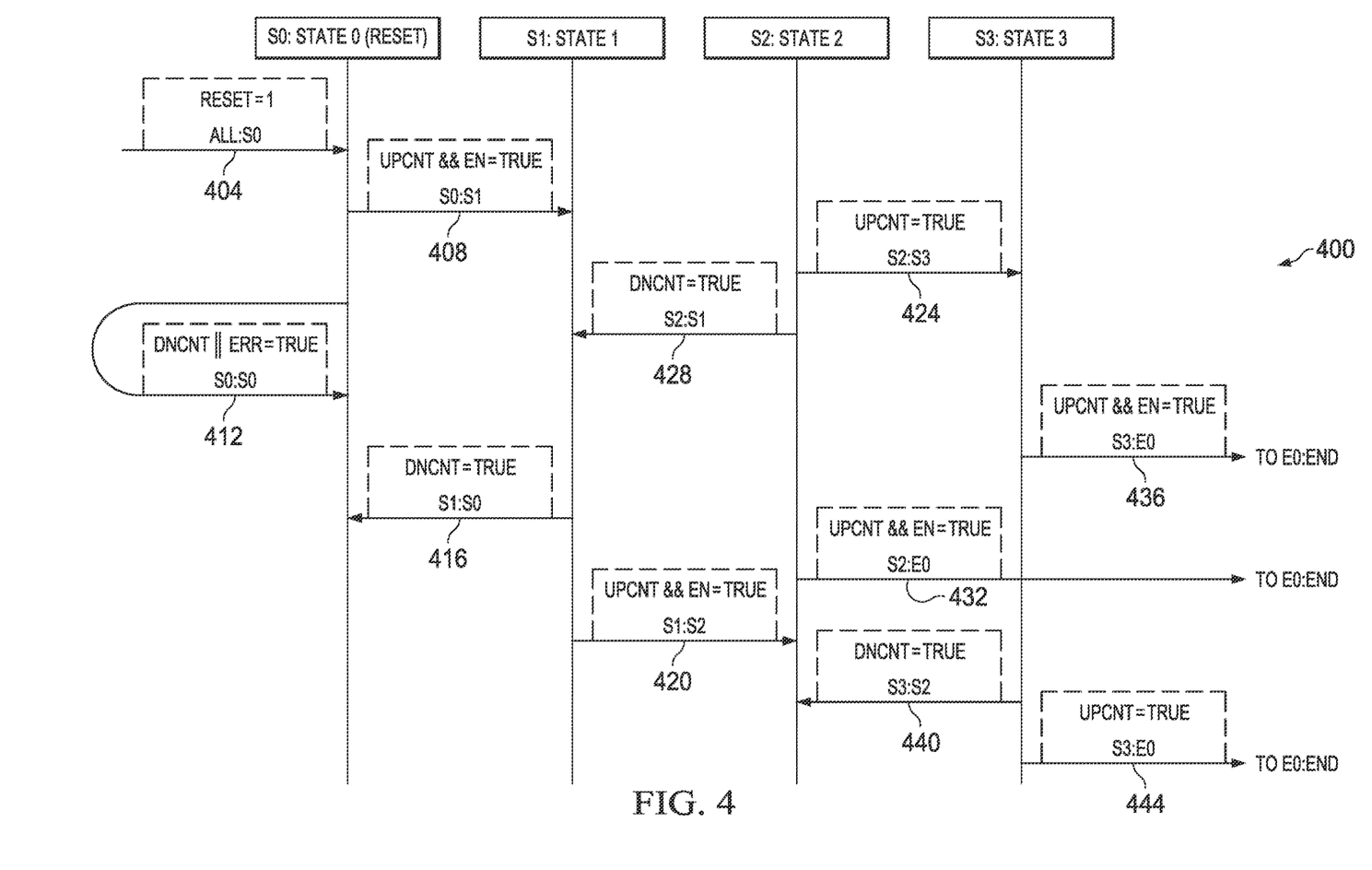
FIG. 4 is an example of a state diagram of an FSM.

FIG. 4 illustrates a state diagram 400 that depicts an example of possible states for the FSM 308 of FIG. 3. The state diagram 400 illustrates four possible states, namely, state 0, S0, state 1, S1, state 2, S2 and state 3, S3. Additionally, it is presumed that the state machine also includes an end state, EU that is not shown. The design of state machines, including the FSM implemented by the state diagram 400 often rely on inaccurate assumptions. In particular, some such FSMs presume that time only elapses when the FSM is in a discrete state, namely when the FSM is in state 0, S0 state 1, S1 state 2, S2 or state 3, S3. Additionally, FSMs are often designed with the inaccurate presumption that state transitions are logically instantaneous, such that only actions taken during a transition are the setting of flag and variables and/or the sending of signals. In such a situation, these actions are taken before the FSM enters the next state. Further still, FSMs are often designed with the presumption that each time a state is entered, the actions of that state are started. Accordingly, a state transition that points back to the same state causes actions to be repeated from the beginning of entry into the state, and that each action started upon entry into a state completes before any tests are made to exit the state. Such presumptions simplify design of the FSM, but can lead to metastable conditions that can impede or prevent the FSM from completing a transition from one state to another.

In the state diagram 400, it is presumed that the FSM includes variables that impact a state of the FSM. In the present example, such variables include, a reset variable, RESET, an up-count variable, UPCNT, a down-count variable, DNCNT, an enable variable, EN and an error variable ERR. Additionally, in the state diagram 400, operations are listed in a vertical axis of each state according to a priority of the operation. Thus, if two operations are possible, based on the state of the variables, the operation with the highest priority on a respective state is executed, and the lower priority operation is not executed. Thus, the priority of operations impacts the state transitions, as described herein.

In state 0, S0, at 404, the FSM detects that the reset variable, RESET has been set to a logical 1. In such a situation, no matter the previous or current state, the FSM transitions to state 0, S0, indicated by the state vector, ALL:S0. State 0, S0 is the initial power-on state where variables are set to known values. In the example illustrated in FIG. 4, it is presumed that assertion of the reset signal, RESET illustrated in FIG. 3 sets the reset variable, RESET to a logical 1. Additionally, in state 0, S0, at 408 if the up-count variable, UPCNT and the enable variable, EN are both set to true (logical 1), the FSM transitions to state 1, S1, as indicated by the state vector S0:S1. Further, in state 0, S0 at 412 if the down-count variable, DNCNT or the error variable, ERR are set to true (logical 1), the FSM stays in state 0, S0 as indicated by the state vector, S0:S0. Additionally, in state 0, S0 it is presumed that the up-count variable, UPCNT has a higher priority than the down-count variable, DNCNT, when both the up-count variable, UPCNT and the down-count variable, DNCNT are true (logical 1). Thus, if both the up-count variable, UPCNT and the down-count variable, DNCNT are true (logical 1) the operation at 408 is executed, and the FSM transitions to state 1, S1.

In state 1, S1, at 416, if the down-count variable, DNCNT is true (logical 1), the FSM transitions to state 0, S0, as indicated by the state vector S1:S0. Additionally in state 1, S1, at 420, if the up-count variable, UPCNT and the enable variable, EN are true (logical 1) the FSM transitions to state 2, S2, as indicated by the state vector, S1:S2. In state 1, S1 it is presumed that the down-count variable, DNCNT has a higher priority than the up-count variable, UPCNT. Accordingly, if both the up-count variable, UPCNT and the down-count variable, DNCNT are true (logical 1) the operation at 416 is executed, and the FSM transitions to state 0, S0.

In state 2, S2 at 424, if the up-count variable, UPCNT is true (logical 1), the FSM transitions to state 3, S3, as indicated by the state vector S2:S3. In state 2, S2, at 428 if the down-count variable, DNCNT is true (logical 1), the FSM transitions to state 1, S1, as indicated by the state vector S2:S1. In state 2, at operation 432, if the up-count variable, UPCNT and the enable variable, EN are true (logical 1), the FSM transitions to state EU (not shown), as indicated by the state vector, S2:E0. However, in state 2, S2 the state transition to EU at operation 432 is not executed because in both operations 424 and 432, the up-count variable, UPCNT is set to true (logical 1) and the operation at 424 has a higher priority than the operation at 432. Accordingly, the operation at 432 is presumed to be superfluous.

In state 3, S3, at 436, at operation 436, if the up-count variable, UPCNT and the enable variable, EN are true (logical 1), the FSM transitions to state EU (not shown). In state 3, S3, at 440, if the down-count variable, DNCNT is true (logical 1), the FSM transitions to state 2, as indicated by the state vector S3:S2. In state 3, S3 at operation 444, if the up-count variable, UPCNT is true (logical 1), the FSM transitions to the end state, EU, as indicated by the state vector S3:E0. Moreover, in state 3 because the operation at 436 has a higher priority than the operation at 444, the operation at 444 would only be executed if the enable variable, EN is false (logical 0) and the up-count variable, UPCNT is true (logical 1).

As demonstrated by the state diagram 400, even a simple FSM can have complexities that can lead to unexpected behavior, particularly if the FSM is designed without full regard to priorities of operation. Moreover, if power to the FSM goes to a sub-threshold level, some of the variables may be set to a metastable state, which can impede or prevent the FSM from completing the transition between states.

In the state diagram 400, it is presumed that a guardian circuit module, such as the guardian circuit module 100 of FIG. 1, the guardian circuit module 200 of FIG. 2, and/or the guardian circuit module 304 of FIG. 3 is configured to monitor transitions between the states, S0-S3. In such a situation, the guardian clock module asserts a trigger signal in response to detecting a state transition (indicated by the illustrated state vectors). If a state transition does not complete within a threshold number of cycles of a dedicated clock signal provided to the guardian circuit module, the guardian circuit module asserts a reset signal, which causes the FSM characterized in the state diagram 400 to execute operation 404, such that the FSM transitions to state 0, S0.

Referring back to FIG. 3, as demonstrated in FIGS. 1 and 2, the guardian circuit module 304 is implemented with a simple design. In fact, as demonstrated in FIG. 4, the guardian circuit module 304 has logic that is simpler than the FSM 308. Additionally, as demonstrated in FIG. 4, assertion of the reset signal, RESET causes the FSM to enter a safe state (state 0, S0, in FIG. 4), if FSM 308 does not complete a state transition within a threshold number (e.g., five) of clock cycles of the guardian clock cycle, GUARD CLK.

Figure 5:
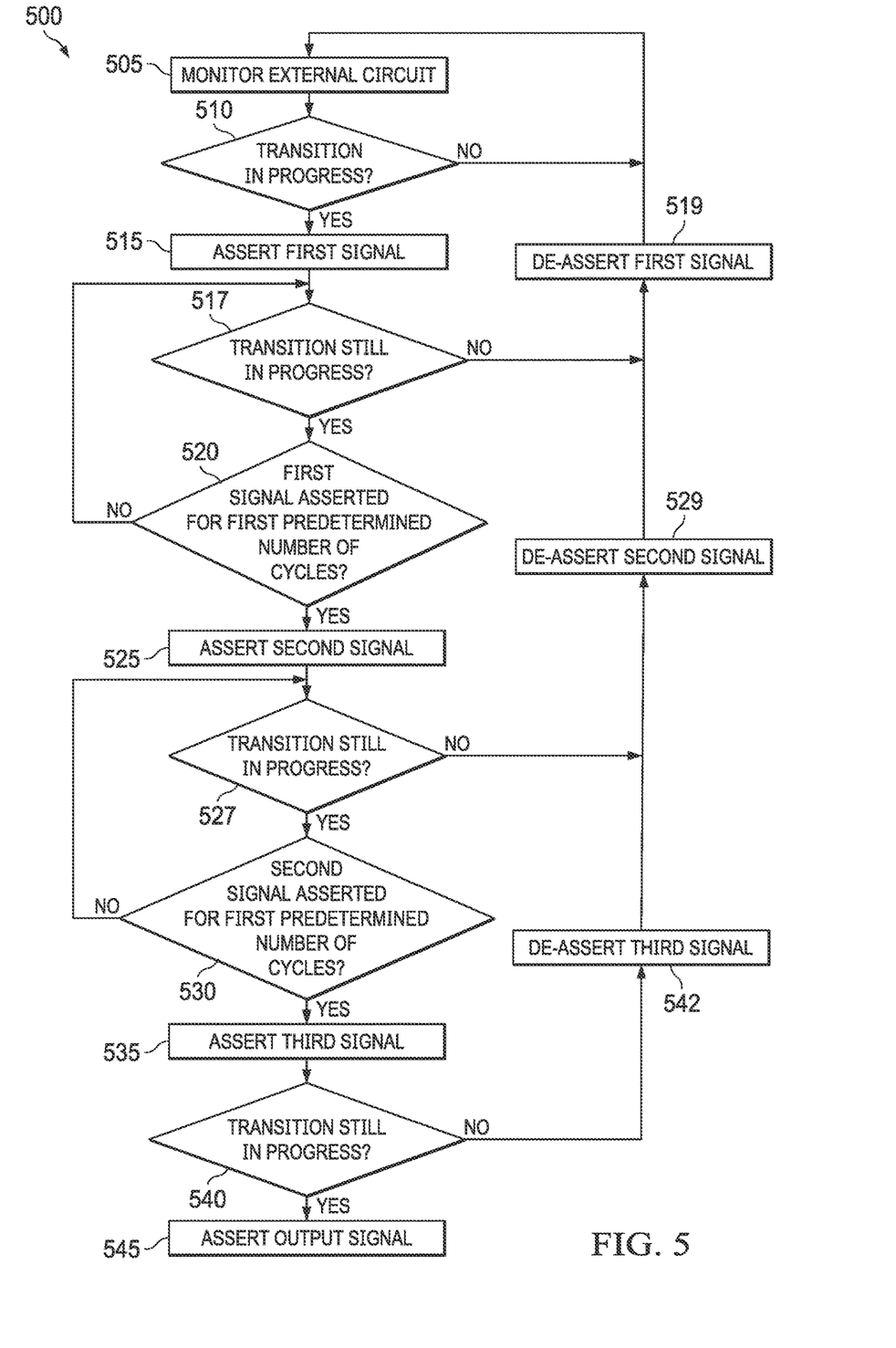
FIG. 5 is a flowchart of an example method for monitoring operations of an external circuit.

FIG. 5 illustrates a flowchart of an example method 500 for monitoring operations of an external circuit. In some examples, the method 500 is implemented by a circuit, such as the guardian circuit module 100 of FIG. 1, the guardian circuit module 200 of FIG. 2, and/or the guardian circuit module 304 of FIG. 3. In some examples, the external circuit is implemented with the external circuit 103 of FIG. 1. In such a situation, the external circuit is implemented as an FSM.

At 505, the circuit monitors the operations of the external circuit. At 510, a determination is made by a guard trigger circuit (e.g., the guard trigger 104 of FIG. 1) of the circuit as to whether a transition in the external circuit is in progress. In some examples, the determination at 510 is made based on a comparison of signals, such as the state signal, STATE, the next state signal, NEXT STATE, the brownout signal, BROWNOUT and/or the guard enable signal, GUARD ENABLE of FIG. 1. In other examples, other combinations and/or subsets of signals are employable to enable the detection at 510. If the determination at 510 is negative (e.g., NO) the method 500 returns to 505). If the determination at 510 is positive (e.g., YES), the method 500 proceeds to 515.

At 515, the guard trigger circuit of the circuit asserts a first signal, such as the trigger signal, TRIGGER_N of FIG. 1. At 517, a determination is made as to whether the transition is still in progress. If the determination at 517 is negative (e.g., NO), the method 500 proceeds to 519. If the determination at 517 is positive (e.g., YES), the method proceeds to 520. At 519, the first signal is de-asserted, indicating that the transition has completed, and the method 500 returns to 505.

At 520, a determination is made as to whether the first signal has been asserted for a first predetermined number of clock cycles of a dedicated clock signal. The determination at 520 is made, for example, by a reset synchronizer circuit of the circuit, such as the reset synchronizer 108 of FIG. 1. If the determination at 520 is negative (e.g., NO), the method 500 returns to 517. If the determination at 520 is positive (e.g., YES), the method 500 proceeds to 525.

At 525, the reset synchronizer circuit of the circuit asserts a second signal, such as the synchronization signal, SYNC_N of FIG. 1. At 527, another determination is made as to whether the transition is still in progress. If the determination at 527 is negative (e.g., NO), the method 500 proceeds to 529. If the determination at 527 is positive (e.g., YES), the method proceeds to 530. At 529, the second signal is de-asserted, indicating that the transition has completed, and the method 500 returns to 519.

At 530, a determination is made as to whether the second signal has been asserted for a second predetermined number of clock cycles of the dedicated clock signal. The determination at 530 is made, for example, by a timeout circuit of the circuit, such as the timeout circuit 116 of FIG. 1. If the determination at 530 is negative (e.g., NO), the method 500 returns to 527. If the determination at 530 is positive (e.g., YES), the method 500 proceeds to 535.

At 535, the timeout circuit of the circuit asserts a third signal, such as the timeout signal, TIMEOUT of FIG. 1. At 540, yet another determination is made as to whether the transition is still in progress. The determination at 540 is made, for example, by a reset requestor circuit of the circuit, such as the reset requestor 112 of FIG. 1 comparing the first signal and the third signal. For instance, if the reset requestor determines that the third signal and the first signal are both asserted concurrently, the determination at 540 is positive, and the determination at 540 is negative if either (or both) the third signal or the first signal are de-asserted. If the determination at 540 is negative (e.g., NO), the method 500 proceeds to 542. If the determination at 540 is positive (e.g., YES), the method 500 proceeds to 545. At 542, the third signal is de-asserted and the method 500 returns to 529. At 545, the reset requestor asserts an output signal, such as the reset signal, RESET of FIG. 1. In some examples, the output signal is provided to an input node of a controller that includes the external circuit, such as the controller 312 of FIG. 3.

Modifications are possible in the described examples, and other examples are possible, within the scope of the claims.

What is claimed is:

1. A circuit comprising:
    a guard trigger circuit comprising:
       a first input configured to receive a first state signal;
       a second input configured to receive a second state signal;
       a first logic gate coupled to the first input and the second input;
       a second logic gate coupled to an output of the first logic gate; and
       an output;
    a reset synchronizer circuit comprising:
       an input coupled to the output of the guard trigger circuit;
       a clock input configured to receive a clock signal;
       a first flip-flop coupled to the input and to the clock input; and
       an output coupled to an output of the first flip-flop;
    a timeout circuit comprising:
       an input coupled to the output of the reset synchronizer circuit;
       a clock input configured to receive the clock signal;
       a first flip-flop coupled to the input and to the clock input; and
       an output coupled to an output of the first flip-flop; and
    a reset requestor circuit comprising:
       a first input coupled to the output of the guard trigger circuit;
       a second input coupled to the output of the timeout circuit;
       a first logic gate coupled to the first input and the second input; and
       an output coupled to an output of the first logic gate.

2. The circuit of claim 1, wherein the guard trigger circuit comprises a third input coupled to the second logic gate.

3. The circuit of claim 2, wherein the guard trigger circuit comprises a fourth input coupled to the second logic gate.

4. The circuit of claim 3, wherein the second logic gate of the guard trigger circuit comprises an inverted input to the fourth input.

5. The circuit of claim 1, wherein the reset synchronizer circuit further comprises a second flip-flop coupled to the input of the reset synchronizer circuit, the clock input of the reset synchronizer circuit, and the first flip-flop of the reset synchronizer circuit.

6. The circuit of claim 1, wherein the timeout circuit further comprising a second flip-flop coupled to the input of the timeout circuit, the clock input of the timeout circuit, and the first flip-flop of the timeout circuit.

7. The circuit of claim 6, wherein the timeout circuit comprises a third flip-flop coupled to the input of the timeout circuit, the clock input of the timeout circuit, and the second flip-flop of the timeout circuit.

8. The circuit of claim 1, wherein the first flip-flop comprises a D flip-flop.

9. The circuit of claim 1, wherein:
the guard trigger circuit is configured to provide a trigger signal via the output of the guard trigger circuit;
the reset synchronizer circuit is configured to provide a synchronization signal via the output of the reset synchronizer circuit based on the trigger signal;
the timeout circuit is configured to provide a timeout signal via the output of the timeout circuit based on the synchronization signal; and
the reset requestor circuit is configured to provide a reset signal via the output of the reset requestor circuit based on the trigger signal and the timeout signal.

10. The circuit of claim 9, wherein the reset signal is configured to be coupled to an input of a controller.

11. The circuit of claim 1, wherein the first flip-flop comprises a cascaded D flip-flop.

12. The circuit of claim 1, wherein the first logic gate of the reset requestor circuit comprises an AND gate.

13. The circuit of claim 1, wherein first logic gate of the guard trigger circuit comprises an XNOR gate and the second logic gate of the guard trigger circuit comprises an OR gate.

14. The circuit of claim 1, wherein the first logic gate of the reset requestor circuit comprises an inverted input coupled to the output of the guard trigger circuit.

15. A circuit comprising:
a clock generator circuit configured to output a clock signal;
a controller including a finite state machine (FSM) and FSM state logic coupled to the FSM, the FSM state logic configured to output a first state signal and a second state signal, the controller further including a system clock generator configured to generate a system clock signal and to provide the system clock signal to the FSM; and
a guardian circuit configured to receive the clock signal from the clock generator circuit and the first and second state signals from the controller and to generate a reset signal based on the first and second state signals.

16. The circuit of claim 15, wherein the clock signal has a counter interval that is longer than the system clock signal employed for controlling operations of the FSM.

17. The circuit of claim 15, wherein the circuit is coupled to a sensor.

18. A circuit comprising:
a clock generator circuit configured to output a clock signal;
a controller configured to output a first state signal and a second state signal; and
a guardian circuit configured to receive the clock signal from the clock generator circuit and the first and second state signals from the controller and to generate a reset signal based on the first and second state signals,
wherein the controller is configured to output a guard enable signal and a brown-out signal to the guardian circuit, and wherein the reset signal is further based on the brown-out signal and the guard enable signal.

19. A circuit comprising:
a clock generator circuit configured to output a clock signal;
a controller configured to output a first state signal and a second state signal; and
a guardian circuit configured to receive the clock signal from the clock generator circuit and the first and second state signals from the controller and to generate a reset signal based on the first and second state signals,
wherein the guardian circuit comprises:
a guard trigger circuit configured to receive the first and the second state signal;
a reset synchronizer circuit coupled to the guard trigger circuit;
a timeout circuit coupled to the reset synchronizer circuit; and
a reset requestor circuit coupled to the timeout circuit, the reset requestor circuit configured to output the reset signal.

* * * * *